US006763279B2

(12) United States Patent
Davis

(10) Patent No.: US 6,763,279 B2
(45) Date of Patent: Jul. 13, 2004

(54) SYSTEM AND METHOD FOR EFFICIENTLY INSCRIBING BULLION ARTICLES UTILIZING A MILLING TOOL AND A NUMERIC CONTROLLER

(76) Inventor: Glen Davis, 8830 Sussex Dr., White Lake, MI (US) 48386

( * ) Notice: Subject to any disclaimer, the term of this patent is extended or adjusted under 35 U.S.C. 154(b) by 142 days.

(21) Appl. No.: 09/974,701

(22) Filed: Oct. 9, 2001

(65) Prior Publication Data

US 2003/0069663 A1 Apr. 10, 2003

(51) Int. Cl.[7] .............................................. G06F 19/00

(52) U.S. Cl. ...................... 700/117; 700/118; 700/164; 700/169; 700/180; 700/182; 101/3.1; 101/32; 156/62

(58) Field of Search ................................ 700/146, 150, 700/160, 182, 84, 169, 117, 118, 164, 180; 156/62; 101/3.1, 32

(56) References Cited

U.S. PATENT DOCUMENTS 4,063,346 A 12/1977 Simpson et al. ........... 29/527.7
4,254,544 A 3/1981 Barker ...................... 29/527.3
5,073,069 A 12/1991 Line ............................ 49/197
5,703,782 A * 12/1997 Dundorf ..................... 700/182
5,714,367 A 2/1998 Quick et al. ................ 428/195
5,826,504 A * 10/1998 Elmassian .................... 101/32

* cited by examiner

*Primary Examiner*—Leo Picard
*Assistant Examiner*—Carlos R. Ortiz
(74) *Attorney, Agent, or Firm*—Gifford, Krass, Groh, Sprinkle, Anderson & Citkowski, P.C.

(57) ABSTRACT

A system and method for inscribing a bullion article, including a first processor having a display terminal and a mouse controller. A drawing program generates and displays a selected font illustration. The processor incorporates a program for rendering a single line art representation of the displayed font, typically through the use of the mouse to retrace a center line of the font. The manual redrawing is then saved as a file in a first format and converted to a second format for subsequent transmission and execution by a numerical controller. A milling tool is instructed by the controller to inscribe, to a selected depth, the surface of the bullion article in single pass fashion. A CNC Mill, sander, polish and polishing cloths, and sealant for treating and finishing the inscribed articles are provided, such articles typically including both minted and milled/inscribed faces.

19 Claims, 3 Drawing Sheets

SYSTEM AND METHOD FOR EFFICIENTLY INSCRIBING BULLION ARTICLES UTILIZING A MILLING TOOL AND A NUMERIC CONTROLLER

BACKGROUND OF THE INVENTION

1. Field of the Invention

The present invention relates generally to milling and inscription processes applicable to various types of articles for the purpose of creating customized personal bullion commemoratives. More specifically, the present invention discloses a novel system and method for inscribing bullion and/or precious metal articles with an appropriate milling tool numerically controlled to achieve the inscription in single-pass fashion, such as through the manipulation of a conventional writing program (COREL DRAW®) in order to recreate, in single-line art fashion, an abbreviated file from a font associated with the writing program and issued to the numerical control software of the milling tool. An overall method for minting, preparing and finishing an inscribed bullion or precious metal article is also disclosed.

2. Description of the Prior Art

The prior art is well documented with examples of inscription or engraving systems, such as for use with items of gold, other precious metals, jewelry, or other commemoratives. For years, engravers and engraving tools have been used to etch the surface of all types of precious metals, jewelry, and other commemorative items. Similar technology has been employed in the sign-making industry. An example of this is set forth in U.S. Pat. No. 5,714,367, issued to Quick et al., and which discloses a multi-layered sign blank material for computer-aided routing, particularly in which the letter or graphic making medium is gold. Steps include the creation of a sign blank and the deposition of a thin layer of gold vapor and an upper transparent routing layer which can be routed and cured to reveal the presence of selected portion of the vapor deposited gold layer. Quick et al. basically teaches a more efficient means by which to impart gold lettering on signage, which is unrelated to the present application in scope and end result.

U.S. Pat. No. 5,073,069, issued to Line, teaches a machine for milling the ends of ingots or slabs. The machine includes a fixed standard, a broach head mounted to slide on two vertical guiding slideways with which the standard is provided and bearing a horizontal axis cylindrical mill. The fixed standard, oversized, presents a transverse conduit opening out between the two slideways in front of the mill and so that the piece to be machined is disposed in the conduit and fixed by fixation means placed as close as possible to the slideways. Line teaches of a more efficient milling machine, said machine improving the cut to the ends of large slabs or ingots. Although a milling machine is used in one step in the process described herein, the machine itself is unrelated to the present application in both scope and end result.

U.S. Pat. No. 4,063,346, issued to Simpson, discloses a silver color proof coin or medal and method for making the same which utilizes electrolytic etching to eliminate copper coloring associated with a copper-silver alloy coin. In this fashion, a proof coin is produced from such an alloy and in which the silver and copper are present in approximately equal portions, and which has a color equivalent to that of sterling silver coins. Although Simpson does teach a methodology hypothetically feasible in creating a commemorative type coin, the prior art displayed here pertains to the preparation of the metal one would use in creating an alloy commemorative, and not the process of creating the commemorative itself.

SUMMARY OF THE PRESENT INVENTION

The present invention discloses a novel system and method for milling or inscribing bullion or precious metal articles with an appropriate milling tool numerically controlled to achieve the inscription in single-pass fashion, such as through the manipulation of a conventional writing program (COREL DRAW®) in order to recreate, in single-line art fashion, an abbreviated file of a given font associated with the writing program and issued to the numerical control software of the milling tool. The system and method of the present invention is particularly an improvement over prior art inscription processes which require detailed and repetitive milling cycles, such as are necessary to machine the outline of each character associated with the thickened font representations. Additionally, prior established art, such as standard engraving technology, only allows for surface etching to be accomplished with a depth of cut of only 0.001" or 0.002". The method described herein allows for cutting depths of up to 0.500" in single pass fashion, providing consumers with a much deeper and richer looking result for the same cost. As also previously disclosed, the invention also describes an overall method for minting, preparing, and finishing a custom inscribed or milled bullion article.

A first processor, typically a computer with hard drive, is provided and which also includes a display terminal and a pointer-operating mouse. The first processor incorporates a drawing program, typically Corel Draw® or other similar program and which is capable of displaying a typed presentation according to one of a plurality of differing fonts. A program associated with the first processor represents the font illustration, typically in magnified fashion, on the display terminal and, through the use of the mouse, enables the operator to retrace a single and center line representation of the font (centered between the outer edges of the font display).

A file is created of the single line art representation, typically in COREL (.cdr) format and converted to a second CMP (.dxf) format prior to being forwarded to a second processor. A numerical controller either forms part of or is further communicable with the second processor to instruct a specially modified milling tool in performing a single pass inscription of the bullion article. The milling tool is preferably in the form of a specially modified centered drill having a specified included point angle for facilitating the inscription in single pass fashion.

The method of the present invention largely repeats the above-referenced discussion of the system and includes the steps of providing the first processor which incorporates the drawing program containing a plurality of fonts, creating an abbreviated file corresponding to a single line art representation of the given font, converting and forwarding the abbreviated file to a second processor incorporating the numerical controller, and the controller instructing the milling tool to inscribe, in single pass fashion, the font representation onto the object. Additional components and steps of the respective system and method include first, the minting of the bullion itself. Raw bullion or other precious metals in the form of raw ingots or bars are struck with a hardened and highly polished D2 steel die to affix logos, company trademarks, and contact information. The reverse side is then milled perfectly flat, if needed, to a tolerance of 0.001". The actual cutting tool is then customized to provide various point angles depending on the fonts and font sizes or designs being inscribed into the bullion. The next step is the actual custom inscription of the bullion itself, which is accomplished via the CNC Mill or other device, and the single line art discussed previously. The inscription and metal surface is then reworked with a dual action sander, polish and fleece cloths, and sealant. These last steps provide for a high luster and shine while protecting the bullion for oxidation and tarnishing.

BRIEF DESCRIPTION OF THE DRAWINGS

Reference will now be made to the attached drawings, when read in combination with the detailed description, wherein like reference numerals refer to like parts throughout the several views, and in which.

DETAILED DESCRIPTION OF THE PREFERRED EMBODIMENTS

Figure 1:
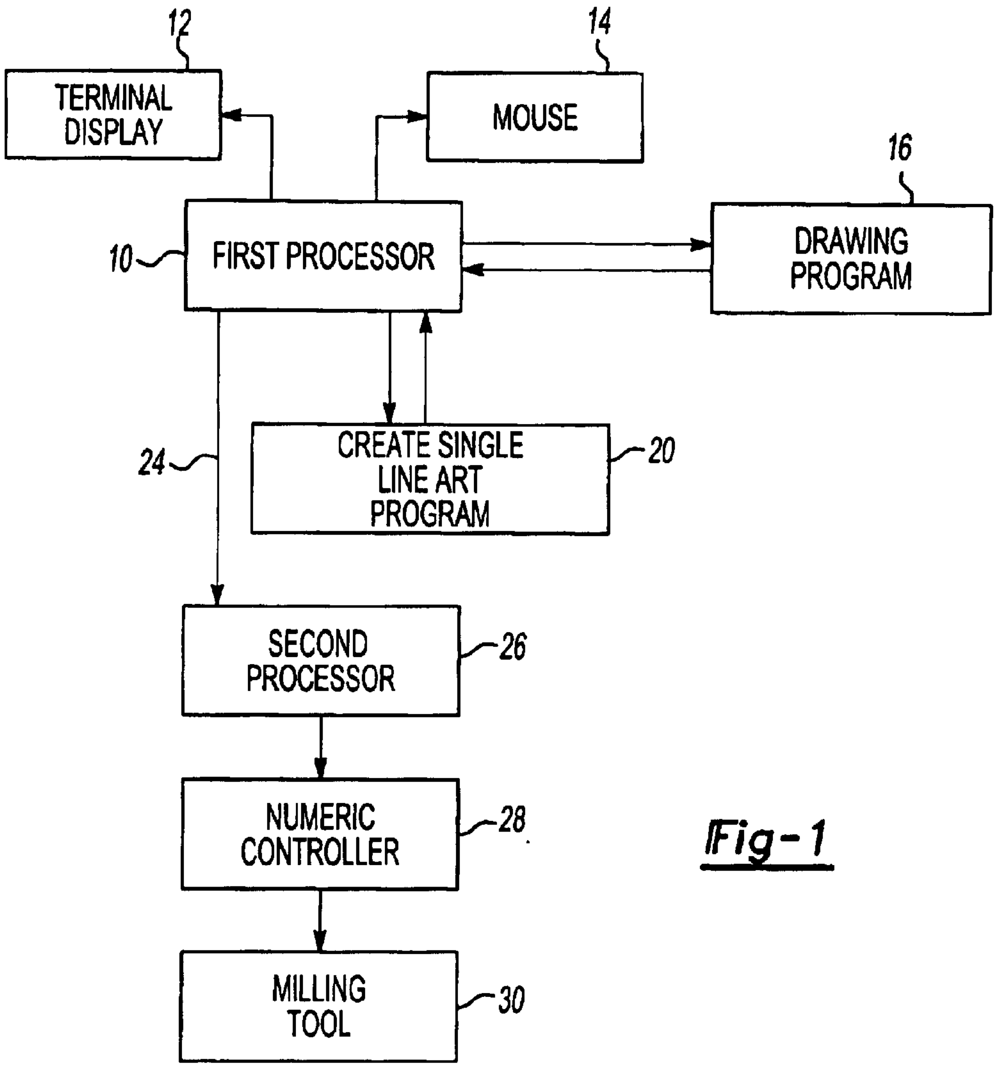
FIG. 1 is first schematic illustrating the arrangement of components defining the system for inscribing the bullion article according to the present invention.

Referring now to FIG. 1, a schematic illustration is shown of a system for inscribing an object, such as a minted gold or silver bullion article, according to the present invention. As previously described, the present invention discloses a novel system and method for inscribing bullion articles with an appropriate milling tool numerically controlled to achieve the inscription in single-pass fashion, such as through the manipulation of a conventional writing program (COREL DRAW®) in order to recreate, in single line art fashion, an abbreviated file of a given font associated with the writing program and issued to the numerical control software of the milling tool. The system and method of the present invention is particularly an improvement over prior art inscription processes which require detailed and repetitive milling cycles, such as are necessary to machine the entire outline of each character associated with the thickened font representations, and which provide only surface etchings with a depth of cut of only 0.001" or 0.002". As previously disclosed, the present invention is capable, in certain applications, of increasing the depth of a single pass milling application to depths of 0.500" giving consumers a much more robust inscription having depth and character for the same cost. As also previously disclosed, the invention also discloses an overall method for preparing and finishing an inscribed bullion article and is now described as follows.

Figure 2:
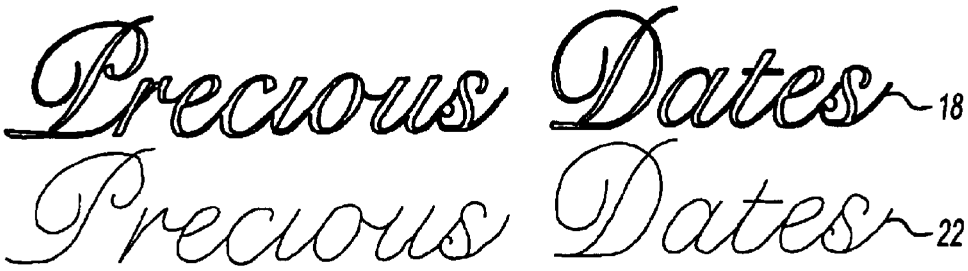
FIG. 2 illustrates a first screen representation of a font design drawn from a suitable drawing program associated with the first processor and a second screen representation resulting from a manual redrawing, in single line art fashion, of the first representation.

Referring again to FIG. 1, a first processor 10, typically a computer with hard drive, is provided and which also includes a display terminal 12 and a pointer operating mouse 14. The first processor incorporates a drawing program 16, typically Corel Draw® or other similar program and which is capable of displaying a typed presentation according to one of a plurality of differing fonts. A selected font is illustrated at 18 in FIG. 2 and typically results from the operator assembling a date, phrase or combined phrase and logo design in a given selected font out of the plurality of fonts stored in the drawing program.

A separate software file program 20 is associated with the first processor 10 and for redrawing and presenting a single line art representation (see at 22 in FIG. 2) of the initial drawing program font illustrated at 18. This is typically accomplished through the terminal display 12 representing the initial font 18 in magnified fashion (typically a magnification factor of up to 100). Through the use of the mouse 14, the operator retrace a single and center line representation of the font 18, centered between the thickened outer edges of the font display 18, and which again results in the single line art representation 22.

Figure 5:
FIG. 5 is an example of a minted and custom milled bullion article.

A file is created of the single line art representation, typically in COREL (.cdr) format and converted to a second CAMP (.dxf) format, CAMP designating a Computer Aided Manufacturing Program, and prior to the file being forwarded, as indicated by directional arrow 24, to a second processor 26. A numerical controller 28 either forms part of or is further communicable with the second processor 26 and, responsive to actual tool paths created by the CAMP conversion of the transmitted file instructs a specially modified milling tool 30 in performing a single pass inscription along a desired surface of the bullion article (see also at 32 in FIG. 5).

Figure 3:
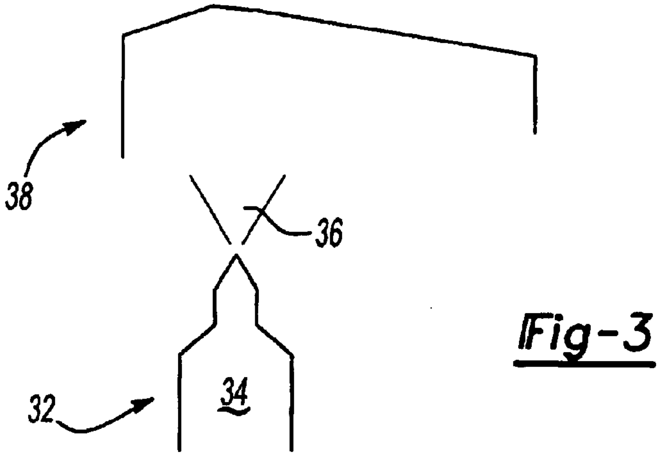
FIG. 3 illustrates one example of a specially modified milling tool for inscribing the bullion article in single pass fashion.

The milling tool is again generally represented at 32 in FIG. 3 and is preferably in the form of a specially modified center drill 34 having a specified included point angle 36 for facilitating the inscription in single pass fashion and again without the need for repetitive milling steps in order to recreate the overall outline of a displayed font, and such as is typical in prior art inscription applications. In the illustrated preferred variant, the milling tool is a #3 Cleveland Tool Center Drill Bit having an initial point angle ranging up to 118 degrees (not shown), and subsequently grinded through an appropriate process step so that the point angle 36 is reduced, in one given embodiment, to an 80 degree angle. An enlarged representation of the cutter profile is also shown at 38 and which better illustrates one arrangement of desired dimensions for accomplishing the single pass inscribing of the article.

As previously described, the 3# Cleveland Bit is then modified using the drill bit grinder (not shown) to have a modified and included point angle ranging up to 80 degrees. It is however understood that any suitable included point angle, less than 90 degrees, can be employed without departing from the scope of the invention. This customized finer point is required using extremely high RPMs (up to 80,000) to provide a cleaner, deeper, and more detailed inscription than prior art forms. Other and additional types of milling tools are also contemplated for use with the present invention, so long as they fulfill the requirements of the CAMP program tool paths and, in particular, are capable of completing the inscription process in single pass fashion. It is also contemplated that the milling tool can inscribe the surface of the object to any desired depth, however it has been found that one preferred range is between 0.0001" to 0.5000" and with a depth of about 0.030" being optimum, depending on the size of the article being inscribed. Smaller articles necessitate shallower inscriptions with more finely modified milling tools. Larger articles support the use of deeper cuts using milling tools with less modification.

Figure 6:
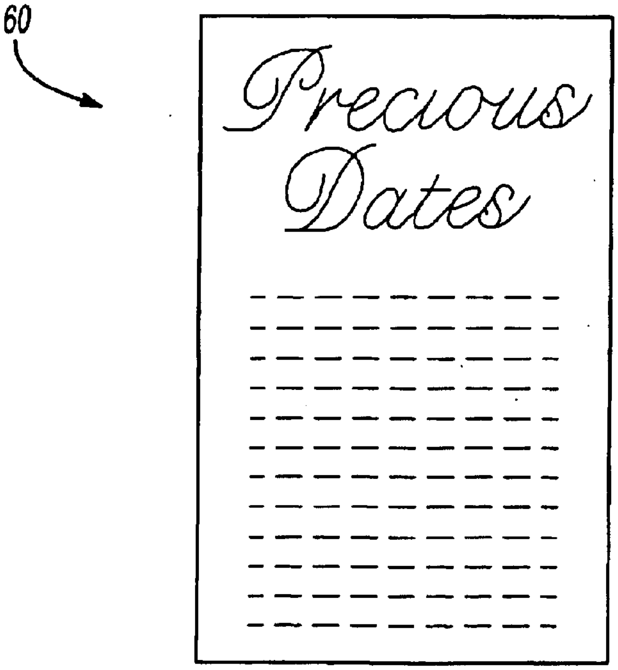
FIG. 6 is an illustration of a reverse face of the bullion article illustrated in FIG. 5 and further showing a minted face.
Figure 4:
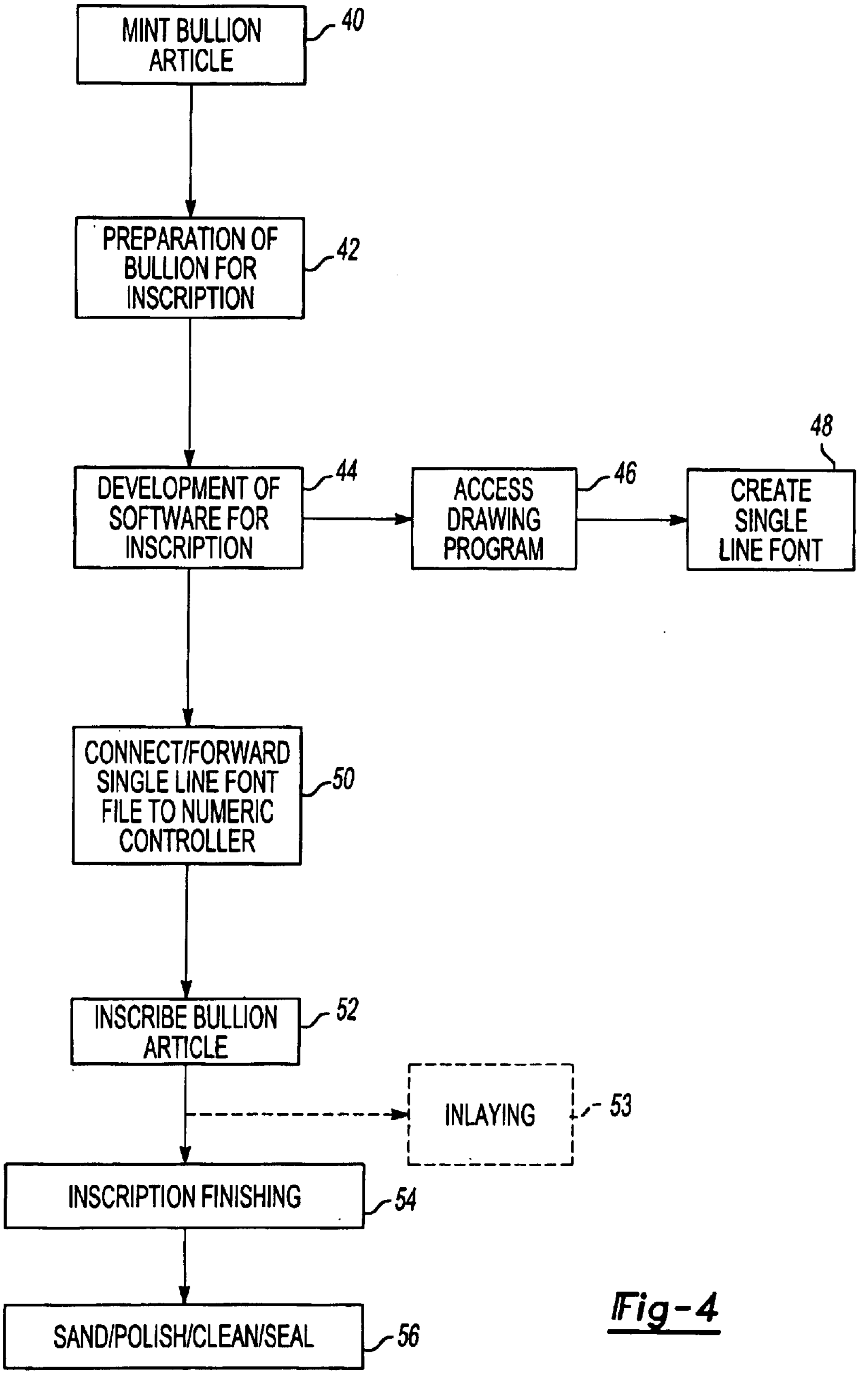
FIG. 4 is a second schematic illustrating the methodology in minting, preparing, inscribing and finishing the bullion articles according to the present invention.

Referring now to FIG. 4, a second schematic illustration is shown of an overall method which derives from the system components previously described, and for minting, preparing, inscribing, and finishing bullion commemorative articles (see again at 32 in FIG. 5) according to the present invention. At step 40, the bullion article (typically either gold or silver) is minted in bar form. The minting process strikes the ingots with a hardened and highly polished D2 steel die to affix company logos, trademarks, and contact information. The use of a highly polished die is necessary to produce a sheen finish on a minted side of the bar, referring also to 60 in FIG. 6 which illustrates one possible minted depiction. The bars are typically graded to 0.999 percent purity and in either 1 oz., 5 oz., 10 oz., 20 oz. or other size/weight (all listings in troy ounces).

At step 42, a CNC Mill (not shown), such as in one example a Bridgeport EZ TRAK Mill, prepares the opposite surface of the bullion bar for inscription, so that one side of the bar or ingot is minted, and the opposite side is custom milled or inscribed per the directions of the consumer via the process described herein. This is typically accomplished by the CNC Mill employing a shell end cutter to make successive passes, typically at depths of between 0.005" to 0.030". A cutting fluid may also be contemporaneously applied and in order to provide for smoother, cleaner cuts and with less tearing and burning of the metal surface. In this fashion, the surface of the bullion bar is rendered as close as possible to perfect flatness and in order to ensure uniform depth in the actual inscription process and to prepare the un-inscribed portions of the article for subsequent sanding and finishing processes.

At step 44, the first processor accesses the computer drawing program (step 46) and, responsive to the initial screen illustration of a selective type font creation (see again at 18 in FIG. 2) creates the single line art presentation 22 (also see step 48). At step 50, the conversion of the created single line art file (such as again from .cdr to .dxf format) is represented, as well as its subsequent transmission to the second processor/numerical controller.

At step 52, the inscription process is again referenced and by which the designated milling tool inscribes the prepared surface of the article in efficient, time saving and single pass fashion and in accordance to a specified depth as also discussed above. In one preferred application, the milling tool is mounted to an Air Turbine Model 230 Spindle or, alternatively, to any other suitable piece of equipment such as the Bridgeport CNC Mill disclosed above. In a further sub-step, the created tool paths associated with the CAMP converted file are loaded into the Spindle/CNC Mill and, concurrent with a desired application of a cutting fluid, the cutting tool is engaged at a desired RPM (such as by example 40,000 RPM) and at the desired cutting depth (again such as between 0.0001" and 0.5000") in order to complete the single pass inscription.

At optional step 53, an inlaying process is employed by which molten gold or other suitable heated, flowable material (e.g., platinum, brass, copper, etc.) is inlaid or poured into the cavity defined by the preceding inscription step 52.

The overall system and process of creating and finishing the inscribed bullion article proceeds with step 54 which illustrates the application of such as a dual action sander and selected grit (by example 240 grit) sandpaper for manually removing burrs left over from the inscription process. A Scotch Brite pad may also be employed to finish sand/micro sand the actual edges of the inscription. Finally, the system and corresponding method terminates with a final (multi) step 56 which fleece cloth and polish (silver and/or chrome) are applied in successive sub-steps to polish the surface of the bullion article. A hot water and solvent washing solution may then be applied and subsequently rinsed with cold water before blow drying. It is also desirable to apply a sealant to the completed product, such as a polyurethane based sealant, and to prevent tarnishing, oxidation, and corrosion, following which the applied sealant is again blow dried. It is also contemplated than any combination or sub-combination of the steps 54 and 56 can be employed within the scope of the invention.

Having described my invention, it is apparent that it discloses and claims a novel system and method for inscribing, in fast and single pass fashion, a surface of any type of object. Other and additional preferred embodiments will become apparent to those skilled in the art to which it pertains, and without deviating from the scope of the appended claims.

I claim:

1. A method for inscribing a three-dimensional commemorative bullion article "exhibiting first and second opposite faces" comprising the steps of:

providing a first processor which incorporates a drawing program containing a plurality of fonts;

creating an abbreviated file corresponding to a single line art representation of a given font;

converting and forwarding said abbreviated file to a second processor incorporating a numerical controller;

minting the first face of the commemorative bullion article; and said numeric controller instructing a milling tool to completely inscribe, in a single pass motion said font representation onto the second face of the commemorative article.

2. The method as described in claim 1, said step of creating said abbreviated file further comprising employing a mouse with said first processor to replicate a center line representation of a selected font.

3. The method as described in claim 2, further comprising the step of magnifying each of a plurality of characters associated with said abbreviated file prior to replicating said center line representation.

4. The method as described in claim 1, said step of converting said file further comprising a first (.cdr) format which is converted by said first processor to a second (.dxf) format.

5. The method as described in claim 1, further comprising the steps of sanding, polishing and finishing the bullion article following inscribing.

6. A system for inscribing a three-dimensional commemorative bullion article "exhibiting first and second opposite faces", comprising:

a first processor incorporating a drawing program capable of generating and displaying a selected font illustration selected from at least one of an operator selected date, phrase or combination thereof, said processor creating a file corresponding to a single line art representation of said selected font illustration;

a second processor communicating with said first processor and associated with a numerical controller for receiving a file transmitted by said first controller in a format readable by said controller;

a minting process for minting the first face of the commemorative bullion article; and said controller operating a milling tool and, upon issuing a command responsive to said transmitted file, said milling tool completely inscribing the second face of the bullion article in a continuous and single pass motion.

7. The system as described in claim 6, further comprising said first processor magnifying each of a plurality of characters associated with said selected font illustration and prior to presenting said illustration onto a display terminal associated with said first processor.

8. The system as described in claim 7, further comprising a computer mouse associated with said first processor and being employed to draw center line representation of said selected and magnified font.

9. The system as described in claim 6, further comprising said first processor converting said file from a first .cdr format to a second. dxf format.

10. The system as described in claim 6, said milling tool further comprising a center drill tool.

11. The system as described in claim 10, said center drill tool further comprising a milling tool including a drill bit having an included point angle ranging up to 90 degrees.

12. The system as described in claim 10, said center drill tool further being modified with a drill bit grinder to have an included point angle ranging up to 90 degrees.

13. The system as described in claim 6, further comprising said milling tool inscribing the surface of the object to a depth of between 0.0001 to 0.5000 inches.

14. The system as describe in claim 6, said system further comprising a CNC Mill for preparing the non-minted surface of said article for inscription.

15. The system as described in claim 6, further comprising a dual action sander for removing burrs remaining from inscribing the bullion article.

16. The system as described in claim 15, further comprising a fleece cloth and semi-chrome polish applied in a first polishing sub-step, a silver polish and second fleece cloth applied in a second polishing sub-step.

17. The system as described in claim 16, further comprising a polyurethane-based sealant applied to the inscribed bullion article to prevent tarnishing, oxidation and corrosion.

18. A method for inscribing a three dimensional bullion article "exhibiting first and second opposite faces", said method comprising the steps of:

providing a first processor which incorporates a drawing program containing a plurality of fonts;

creating an abbreviated file corresponding to a single line art representation of a given font;

converting and forwarding said abbreviated file to a second processor incorporating a numerical controller;

minting the first face of the bullion article; and said numeric controller instructing a milling tool to completely inscribe, in a single pass motion, a first selected font representation onto the second face of the bullion article.

19. A system for inscribing a three dimensional and minted bullion article "exhibiting first and second opposite faces", comprising:

a first processor incorporating a drawing program capable of generating and displaying a selected font illustration, said processor creating a file corresponding to a single line art representation of said selected font illustration;

a second processor communicating with said first processor and associated with a numerical controller for receiving a file transmitted by said first controller in a format readable by said controller;

a CNC mill for preparing a non-minted surface of the article for inscription; and said controller operating a milling tool and, upon issuing a command responsive to said transmitted file, said milling tool completely inscribing said non-minted surface of the object in a continuous and single pass motion.

* * * * *